(12) United States Patent
Godler (10) Patent No.: US 8,256,310 B2
(45) Date of Patent: Sep. 4, 2012

(54) MOTION CONVERSION DEVICE

(75) Inventor: Ivan Godler, Kitakyushu (JP)

(73) Assignee: Ivan Godler, Kitakyushu (JP)

( * ) Notice: Subject to any disclaimer, the term of this patent is extended or adjusted under 35 U.S.C. 154(b) by 707 days.

(21) Appl. No.: 12/397,361

(22) Filed: Mar. 4, 2009

(65) Prior Publication Data
US 2009/0249903 A1 Oct. 8, 2009

(30) Foreign Application Priority Data

Sep. 5, 2006 (JP) ................................. 2006-240304
Jul. 27, 2007 (JP) ................................. 2007-196386

(51) Int. Cl.
*F16H 27/02* (2006.01)
*B25J 18/00* (2006.01)

(52) U.S. Cl. ........................ 74/89.2; 74/490.04; 901/21
(58) Field of Classification Search .................. 74/89.2, 74/490.04; 901/21
See application file for complete search history.

(56) References Cited

U.S. PATENT DOCUMENTS

| | | | |
|---|---|---|---|
| 2,027,386 A * | 1/1936 | Krummer | ..................... 74/99 R |
| 3,864,983 A | 2/1975 | Jacobsen | |
| 4,843,921 A * | 7/1989 | Kremer | .......................... 74/89.2 |

FOREIGN PATENT DOCUMENTS

| JP | S61-86192 | 5/1986 |
|---|---|---|
| JP | P2008-89175 | 4/2008 |

* cited by examiner

*Primary Examiner* — Thomas R Hannon
*Assistant Examiner* — Phillip A Johnson (57) ABSTRACT

Rotary to linear and linear to rotary motion conversion devices that consist of rotational elements, at least two flexible linking elements, and motion elements are disclosed. Rotary elements and motion elements are connected by the flexible linking members, which twist around each other when rotational elements rotate and thus produce pulling force on the motion elements. A methodology to design the motion conversion devices and robotic joints incorporating the motion conversion devices are disclosed.

2 Claims, 7 Drawing Sheets

MOTION CONVERSION DEVICE

CROSS-REFERENCE TO RELATED APPLICATIONS

Japanese patent application: prior. (31) JP 2006-240304 (Sep. 5, 2006), appl. (21) JP 2007-196386 (Jul. 27, 2007), pub. (11) JP 2008-89175 (Apr. 17, 2008)

BACKGROUND OF THE INVENTION (1) Field of the Invention

The present invention relates to motion conversion devices that convert rotary motion into linear motion or torque into pulling force and vice versa. The term linear motion applies throughout the present invention for straight motion, arc motion, partially circular or any arbitrary curved motion that is generated by pulling force. The invented motion conversion device can be used in robotics, welfare, medical equipment, or in general as actuator mechanism for conversion between rotary and linear motion or conversion between torque and pulling force.

(2) Description of Related Art

For robots, medical equipment, prostheses and similar it is required to provide small size power source that produces high pulling force with high efficiency, high conversion ratio, high force amplification ratio, and additionally is of low-cost, lightweight, and has noiseless operation.

The known mechanisms to convert rotation into linear motion are composed of rack and pinion, belts and pulleys, ball and screw, or various linkage mechanisms. In the field of robotics electrical motors are used combined with gear reducers to amplify the torque. Due to low mechanical efficiency and high friction in the gears, free motion of such mechanisms is difficult to achieve.

Figure 13:
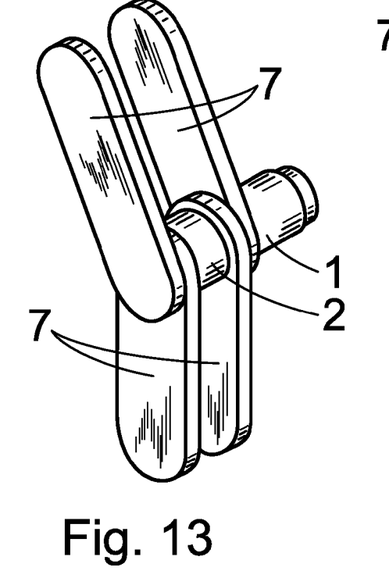
FIG. 13 is an example of conventional pivotal joint mechanism.

An example of a joint driving means of robots and other mechanisms is shown in FIG. 13, where the rotational axis of rotary motion source (motor 1 and gear 2) and axis of the joint are aligned, and the motor 1 is attached at one side of the link 7, which results in poor balance and bad aesthetic impression.

Figure 14:
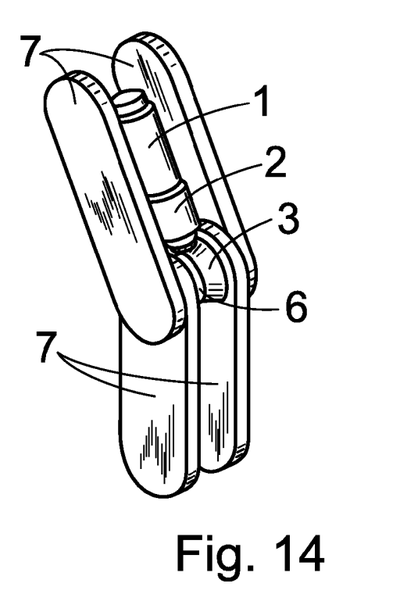
FIG. 14 is an example of conventional pivotal joint mechanism with bevel gear.

Configurations as shown in FIG. 14, where the motor 1 and the gear 2 are aligned with the arm 7 so that the axis of joint 6 is perpendicular to the axis of motor 1 and gear 2, are also used. In such configuration the rotary motion of motor 1 is transmitted to the joint 6 through the gear 2 and orthogonal bevel gear 3. The mechanism appears compact but is more complex due to additional bevel gear which in total results in higher costs, more weight, and more backlash in the system.

Figure 15:
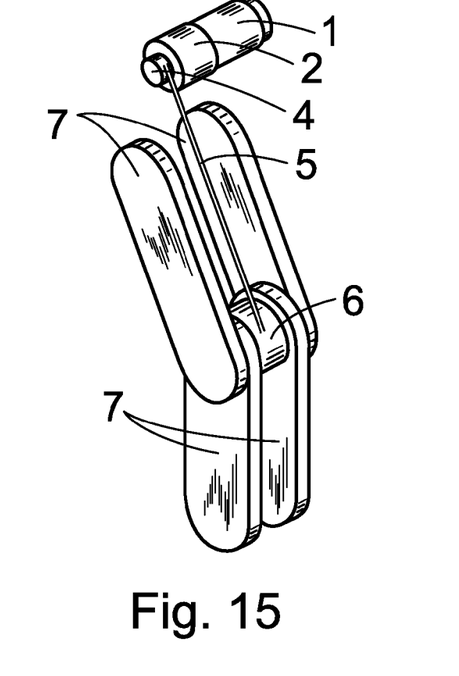
FIG. 15 is an example of conventional pivotal joint mechanism with pulley and wire.

Mechanisms shown in FIG. 15, where motor 1, gear 2, and pulley 4 are positioned at some distance away from the joint 6, and the wire 5 that is fixed to the pulley 4 is driving the joint 6 are also frequently used. In such mechanism the rotary motion of motor 1 is through the gear 2 and pulley 4 converted into linear motion of wire 5, and the linear motion of wire is used to drive the joint 6.

BRIEF SUMMARY OF THE INVENTION

A motion conversion device of the present invention is composed of a rotational element to which two or more flexible linking members being wires, wire ropes, strands, sutures or any other flexible materials are attached at the center of rotation of rotational element and of a motion element that is placed at some distance away from the rotational element in the direction of the rotational axis of the rotational element. Flexible linking members are with the other ends attached equidistantly at a radial distance A from the rotational axis of the rotational element to the motion element. The objective of the present invention is to convert rotary motion of the rotational element into linear motion of the motion element and convert a rotational torque on the rotational element into a pulling force on the motion element and vice versa. The benefits of the present invention are low-cost, lightweight, small size, noiseless operation, high force/torque conversion ratio, high energy efficiency and safety due to low pulling force at the end of operation range. The present invention defines the parameters needed in the design and provides the design process through the derived mathematical formulas thus making possible effective design of a most suitable device for given requirements and enables control of the designed device when used in actuator mechanisms.

The motion conversion devices of present invention are distinguished from the motion converters shown in the patent to Jacobsen U.S. Pat. No. 3,864,983 by the distinguishing feature that flexible linking members twist around each other, and in this way produce higher torque/force conversion ratio over larger motion range resulting in smaller, lighter, lower cost devices composed of less parts in comparison to the previous art.

The present invention is also distinguished from the motion unit disclosed in Japanese patent publication S61-86192 by the distinguishing feature that locations of flexible members' connections to the motion elements are defined by distance A, which is larger then the thickness radius R of the flexible members and is constant during the operation of the device. A benefit of this feature is protection against overload of the flexible members when torque is applied to the rotary element and thus preventing rupture of the flexible members even at low applied torque. Another benefit of the feature is defined mathematical relation between the rotary and linear motion, which enables to build a mathematically model, design, and control the devices of the present invention in effective way.

BRIEF DESCRIPTION OF THE DRAWINGS

The accompanying drawings show embodiments of the invention of which

DETAILED DESCRIPTION OF THE INVENTION

Figure 1:
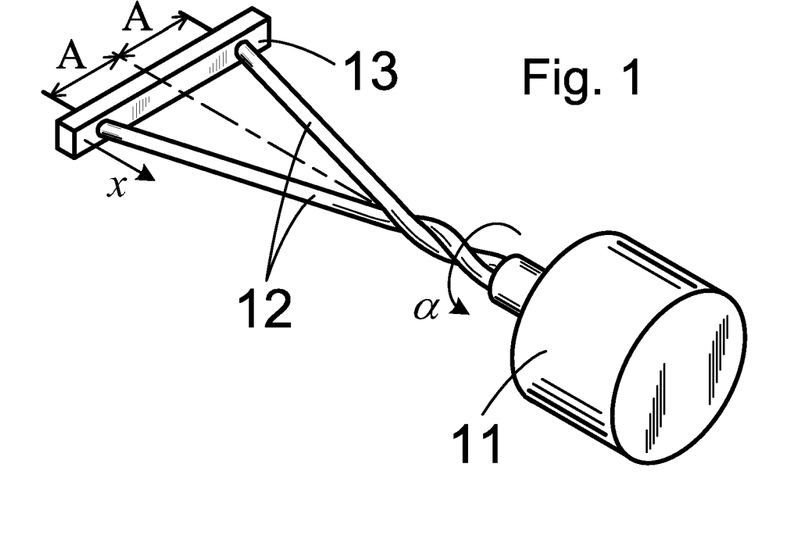
FIG. 1 is a schematic view of a device in accordance with the invention.

A drawing of schematic view of the invention is shown in FIG. 1. The motion conversion device is composed of a rotational element 11 to which at least two flexible linking members being wires, ropes, wire ropes, threads, strands, sutures or other flexible elements with high tensile strength, high compliance, and high fatigue resistance 12 are connected. The flexible linking members 12 can be made of carbon fibers, carbon fibers composite material, high tensile strength resin fibers, metal rope wires or other suitable materials with tensile strength, flexibility and fatigue resistance. One ends of flexible linking members 12 are attached to the rotational element 11 at its center of rotation, and the other ends are connected equidistantly at a distance A from the rotational axis of the rotational element 11 to a motion element 13. The motion element 13 is primarily movable in the direction x so that the relative distance between the rotational element 11 and the motion element 13 decreases when the rotational element 11 is rotated in direction α and the flexible linking members 12 twist around each other. When the rotational element 11 rotates back to its initial position the flexible linking members 12 untwist and a spring force, gravity or other means are applied to motion element 13 to return it to its initial position. The shown implementation of the invention can operate in the described way or in such a way that the motion element 13 is displaced or pulled in the direction that is opposite to the direction x in FIG. 1 and thus generate rotational motion of the rotational element 11 in the direction opposite to the direction α depicted in FIG. 1.

Figure 2:
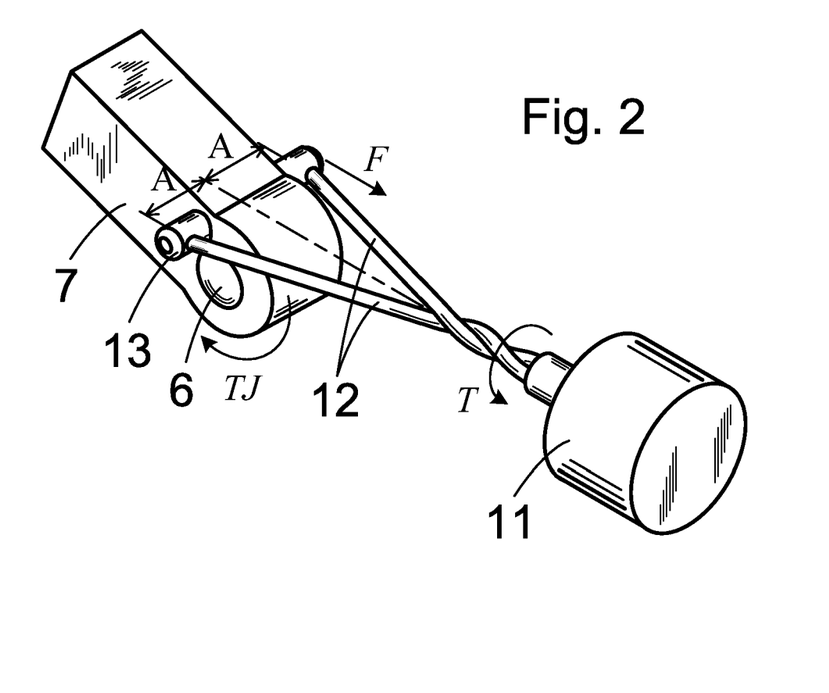
FIG. 2 is a view of an assembly where a pivotal joint is driven by the invention.

In FIG. 2 a motion conversion device is shown where the flexible linking members 12 are with one ends attached to the rotational element 11 at the center of rotation of the rotational element 11 and with the other ends to a motion element 13 which is connected to a link 7 that is pivoted by the joint 6. The rotational torque T on the rotational element 11 is through the twisting of the flexible linking members 12 converted into a pulling force F on the motion element 13 which consequently produces rotational torque TJ on the joint 6 and thus actuate the joint 6.

Figure 3:
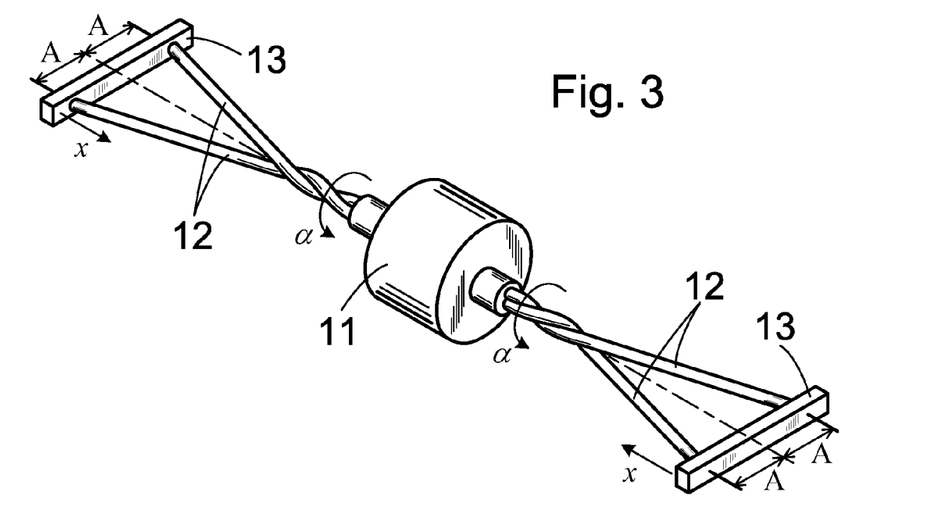
FIG. 3 is a schematic view of embodiment in accordance with the invention where flexible linking members are connected on both sides of rotational element to achieve larger motion range.

Another example of invention embodiment is shown in FIG. 3 where two sets of at least two flexible linking members 12 are attached one set of flexible linking members on each side of a rotational element 11. One ends of each set of flexible linking members 12 are connected at the center of rotation of the rotational element 11 on each side respectively, and the other ends of flexible linking members 12 are connected equidistantly at a distance A from the rotational axis of the rotational element 11 to a pair of motion elements 13 on each side of the rotational element 11. The amount of displacement x of motion elements 13 for a given rotational angle α of the rotational element 11 if added becomes two times larger comparing to the embodiment shown in FIG. 1.

Figure 4:
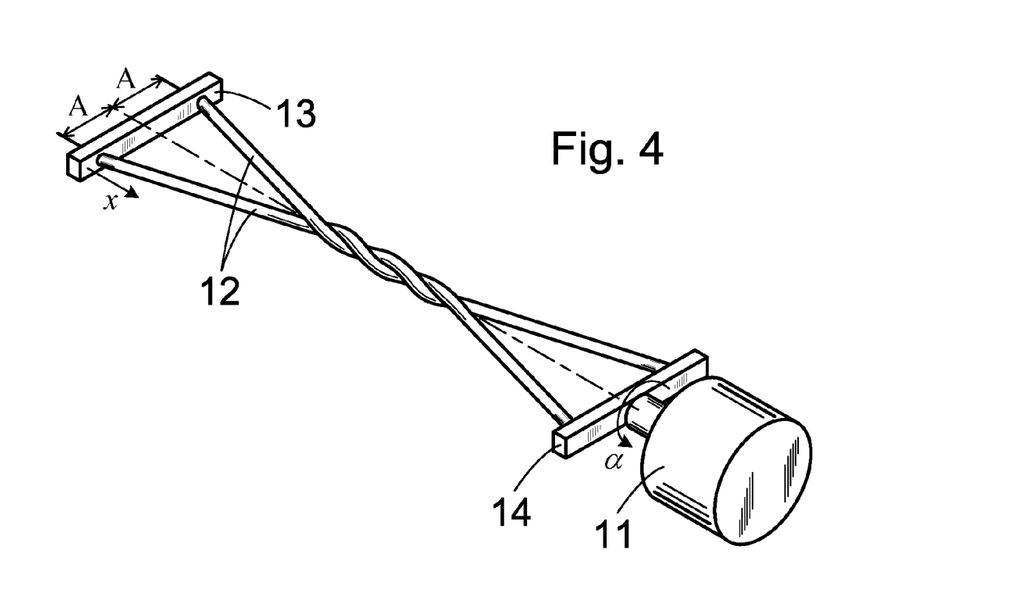
FIG. 4 is a schematic view of embodiment with larger motion range and higher force/torque conversion ratio.

In FIG. 4 a rotational part 14 is attached to a rotational element 11. The rotational part 14 passes through the center of the rotational element 11 and extends in radial direction, and can have a disc shape. At least two flexible linking members 12 are with one ends connected to the rotational part 14 equidistantly at a distance A from the rotational axis of the rotational element 11 and with the other ends connected equidistantly at a distance A from the rotational axis of the rotational element 11 to a motion element 13. In this embodiment a larger motion range and higher force/torque conversion ratio is attainable comparing to the embodiments in FIGS. 1 and 3.

Figure 5:
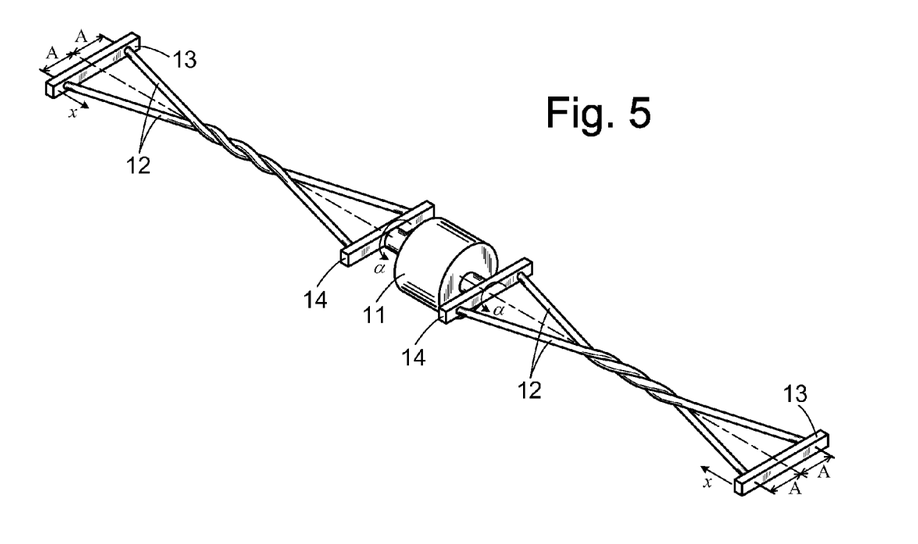
FIG. 5 is a schematic view of embodiment of FIG. 4 assembled on both sides of a rotational element.

In FIG. 5 a rotational element 11 has one rotational part 14 attached on each side. The rotational parts 14 pass through the center of the rotational element 11 and extend in radial direction, and can have a disc shape. Two sets of two or more flexible linking members 12 are with one ends connected to the rotational parts 14 equidistantly at a distance A from the rotational axis of the rotational element 11 on both sides of rotational element 11 respectively. The other ends of the flexible linking members 12 are connected equidistantly at a distance A from the rotational axis of the rotational element 11 to a pair of motion elements 13. In this embodiment the amount of displacement x for a specific rotational angle α of the rotational parts 14 if added becomes two times larger comparing to the embodiment in FIG. 4.

Figure 6:
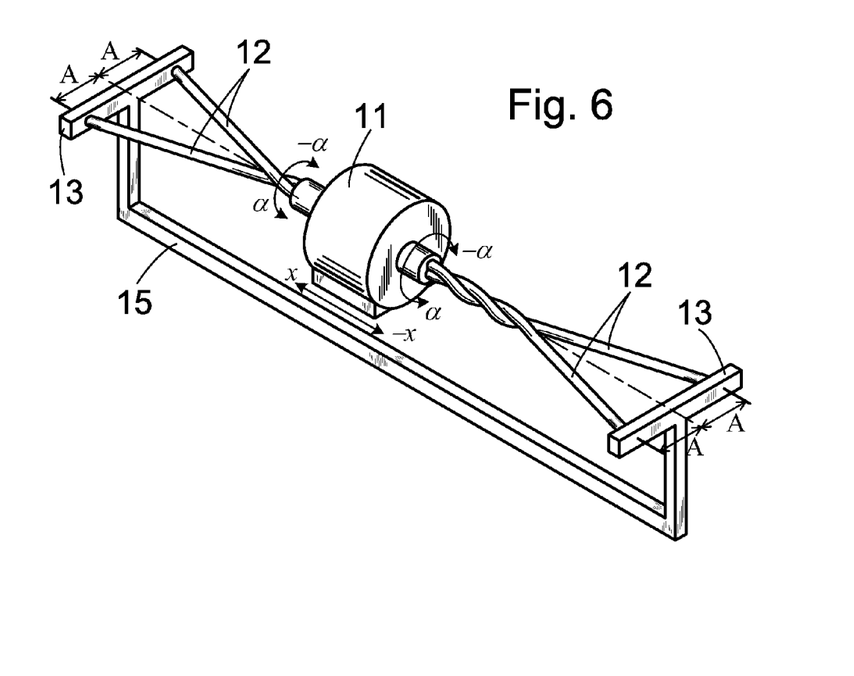
FIG. 6 is a schematic view of invention in which pulling force and/or rotational torque can be generated in two directions.

In FIG. 6 two sets of at least two flexible linking members 12 are connected each with one ends at the center of rotation of rotational element 11 on each side of the rotational element 11 and with the other ends equidistantly at a distance A from the rotational axis of the rotational element 11 to the motion elements 13. The motion elements 13 are connected to each other by a stiff or modestly compliant linking element 15, and the rotational element 11 is supported by means that allow relative sliding of the rotational element 11 against the motion elements 13 primarily in the direction of rotational axis of the rotational element. Particular for this embodiment is that one set of the flexible linking members 12 on one side of the embodiment is twisted in advance, for example in FIG. 6 the right hand side set of flexible linking members 12 is twisted in advance. The embodiment shown in FIG. 6 operates in such a way that the rotational element 11 rotates in such direction that the pre-twisted flexible linking members are untwisted on one side of the embodiment (right hand side in FIG. 6) while flexible linking members on the other side (left hand side in FIG. 6) are twisted and thus generate a motion of the rotational element 11 in the direction x relatively against the linking element 15. Similarly, when flexible linking members on the other side of embodiment (left hand side in FIG. 6) are untwisted and the flexible linking members on the opposite side of the embodiment (right hand side in FIG. 6) are twisted according to rotation of the rotational element 11 in appropriate direction, the rotational element 11 moves in the direction −x relatively against the connection element 15. In this way an actively controlled motion in both +x and −x directions is achieved by this embodiment. This type of embodiment can also be realized by using the embodiment type of FIG. 5.

Figure 7:
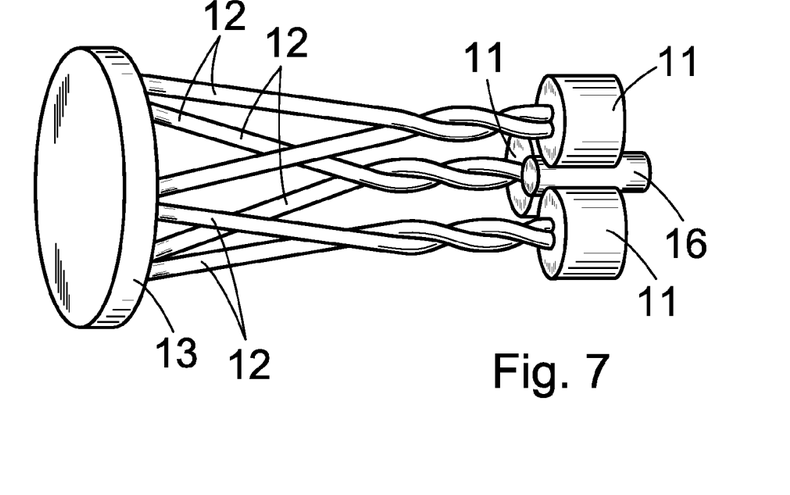
FIG. 7 is a schematic view of embodiment in accordance with the invention where multiple motion conversion devices are used in parallel.

In FIG. 7 another embodiment of the invention is presented. Thinner flexible linking members 12 provide for higher torque/force conversion ratio, however, smaller cross-section of the flexible linking members 12 reduces the pulling force capacity of the device. Consequently, maximum torque of rotational element 11, which can be for example an electrically powered motor, cannot be fully converted into a pulling force with very thin flexible linking members 12. To overcome this limitation, multiple rotary elements 11 are used, and to each rotary element 11 a set of two or more flexible linking members 12 is connected with one ends at the respective centers of rotations and with the other ends to a motion element 13 equidistantly at a distance A to respective rotational axes of respective rotational elements 11. In this way the number of flexible linking members 12 that are used for motion conversion is increased at the same force/torque conversion ratio and with that the total pulling force capacity of the device is increased. Rotation of each rotational element 11 can be realized separately or can be synchronized by using gear transmission mechanism 16 or belt, timing belt, chain or any other suitable mechanism.

Figure 8:
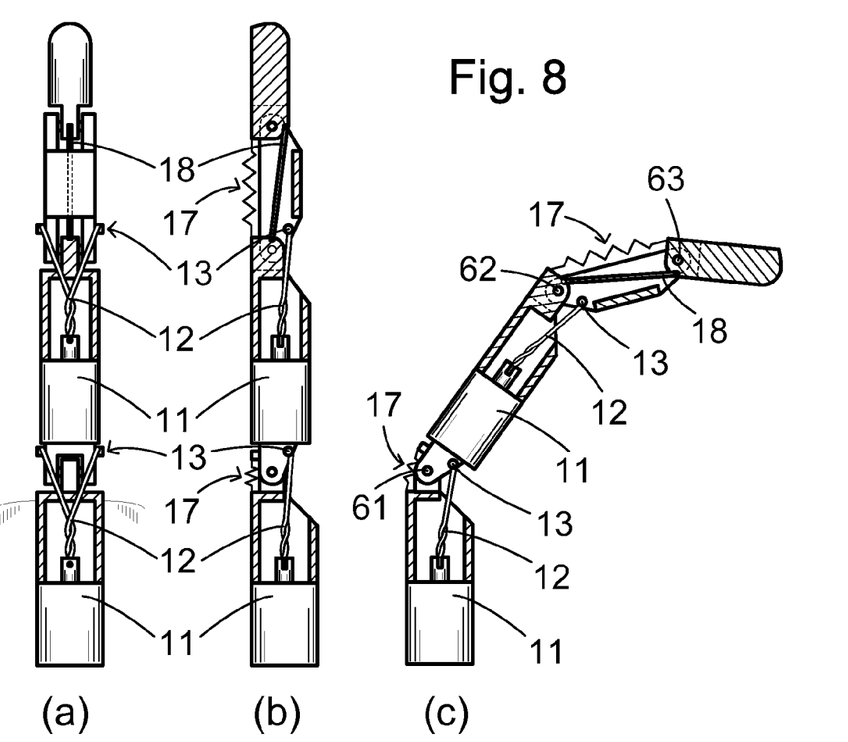
FIG. 8 shows three views of robot finger example in which the present invention is used for actuation.

An example of application of present invention being used in a robotic finger is shown in FIG. 8 where a side view cross-section (a), a front view (b), and a cross-sectional side view of the robotic finger in a bended state (c) are presented. Rotational elements 11 in this application example are electrically powered motors.

In FIG. 8 according to present invention, 12 are flexible linking members 13 are motion elements, which are connected to respective links of the finger in this application, 17 are springs, 61, 62, 63 are pivot joints, 18 is a wire or tendon that couples the joints 62 and 63. One end of the wire or tendon 18 is attached above the center of the joint 62 and the other end horizontally from the joint 63 in the joints extended state as shown in FIG. 8 (b), to achieve a coupled motion of the two joints similarly to what is seen in human fingers.

In this application example the joints 61 and 62 are separately driven by a motion conversion device of the present invention. Rotation of respective rotational elements 11 results in twisting of respective flexible linking members 12 and in this way a pulling force is applied on the respective motion elements 13, which bend the joints as shown in FIG. 8 (c). When respective flexible linking members 12 are untwisted, the joints due to respective springs 17 return into extended states as shown in FIGS. 8 (a) and (b).

In this application example the robotic finger moves similar to that of a human and because there is no gear reducers in the joints, the mechanism is lightweight, low-cost, noiseless, and the joints can be moved by external force without much effort when the respective flexible linking members 12 are untwisted.

The overall benefit of the present invention is that the design parameters are introduced for the case when a pair of flexible linking members is used. The introduced parameters are: length of the flexible linking members L, equivalent or actual cross-section radius of the flexible linking members R, distance from the rotational element's rotational axis to the connecting points of the flexible linking members on the motion element A. The relation between the rotational angle α (in radians) and the linear displacement x can be calculated by the following equation.

$$x = \sqrt{L^2 - A^2} - \sqrt{L^2 - (A + R\alpha)^2}$$

The relation between the pulling force F and rotational torque T can be calculated by the following equation.

$$F = \frac{\sqrt{L^2 - (A + R\alpha)^2}}{R(A + R\alpha)} T$$

The maximum achievable rotation angle $\alpha_{max}$ and the maximum motion range $x_{max}$ are specified by the following two equations.

$$\alpha_{max} = \frac{\pi(L - A)}{R\sqrt{4 + \pi^2}}$$

$$x_{max} = \sqrt{L^2 - A^2} - \frac{2(L - A)}{\sqrt{4 + \pi^2}}$$

By using the above equations in the applications of the present invention, the most suitable design can be obtained for given requirements without much effort. In the following two separate numerical examples are given.

In the first example the present invention is applied to a mechanism with the following specifications: motor output power 2.6 W, motor diameter 17 mm, motor length 25 mm, motor maximum rotational speed 8000 rpm, motor rated torque 4.2 mNm, flexible linking members length L=25 mm, flexible linking members cross-section radius R=0.125 mm, distance of fixture A=7.5 mm, material of flexible linking members: carbon fiber, number of flexible linking members: 2.

Figure 9:
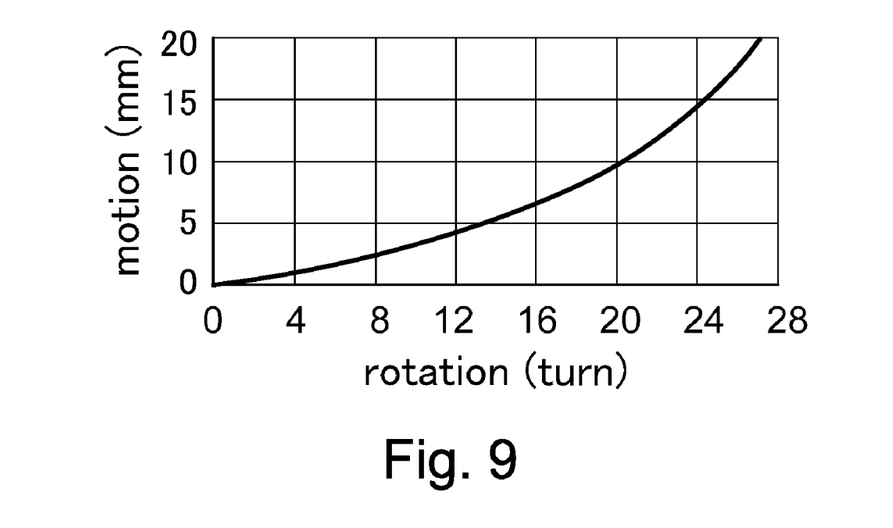
FIG. 9 is an example of relation between rotary and linear motion.
Figure 10:
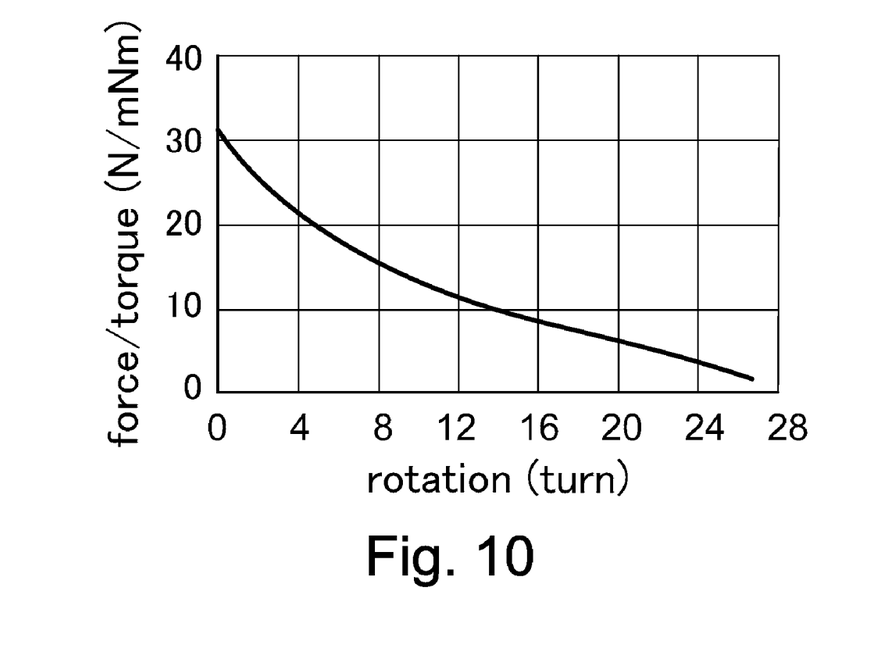
FIG. 10 is an example of relation between pulling force and rotational torque.

The obtained motion conversion characteristic for this example is shown in FIG. 9. The motion conversion ratio varies from minimum of 0.65 mm/turn to maximum 9.3 mm/turn (average 2.8 mm/turn). The transmission ratio between torque and pulling force is shown in FIG. 10. The ratio varies from minimum 0.65 N/mNm to maximum 9.8N/mNm (average 3.5 N/mNm). Maximum linear speed at motor rotational speed of 8000 rpm varies from 28 mm/s to 307 mm/s (average 97 mm/s) and maximum pulling force at motor rated torque of 4.2 mNm is from 11.34N to 130N (average 52.2N). Both characteristics shown in FIGS. 9 and 10 vary throughout the motion range of the device and are therefore nonlinear; however, by using sensors to detect position or force and by applying appropriate control algorithm to control the driving motor, the nonlinearities can be compensated.

The above example used in embodiment as shown in FIG. 2 gives 20 mm motion range of motion element 13, which subsequently at 11.5 mm fixture radius from the pivot joint axis 6 to the motion element 13 results in rotation of the pivot joint 6 for 100 angular degrees. The generated torque in the pivot joint 6 in this case is in the range of 130 mNm to 1495 mNm (average 604 mNm). Rotational speed of the pivot joint 6 in this case is in the range of 0.39 turn/s to 4.3 turn/s (average 1.3 turn/s). An equivalent reduction ratio between rotational element 11 and pivot joint 6 is varying in the range of 342:1 to 31:1 (average 102:1).

In second numerical example the following specifications are given: motor output power 30 W, motor diameter 30 mm, motor length 150 mm, motor maximum rotational speed 3000 rpm, motor rated torque 100 mNm, flexible linking members length L=75 mm, flexible linking members cross-section radius R=0.5 mm, fixture distance on motion element A=30 mm, material of flexible linking members: carbon fiber, number of flexible linking members: 2.

Figure 11:
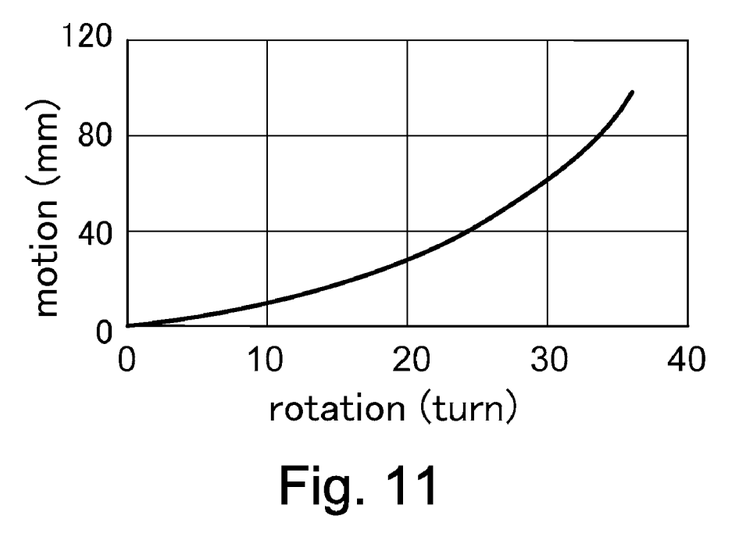
FIG. 11 is another example of relation between rotary and linear motion where larger motion range is achieved.
Figure 12:
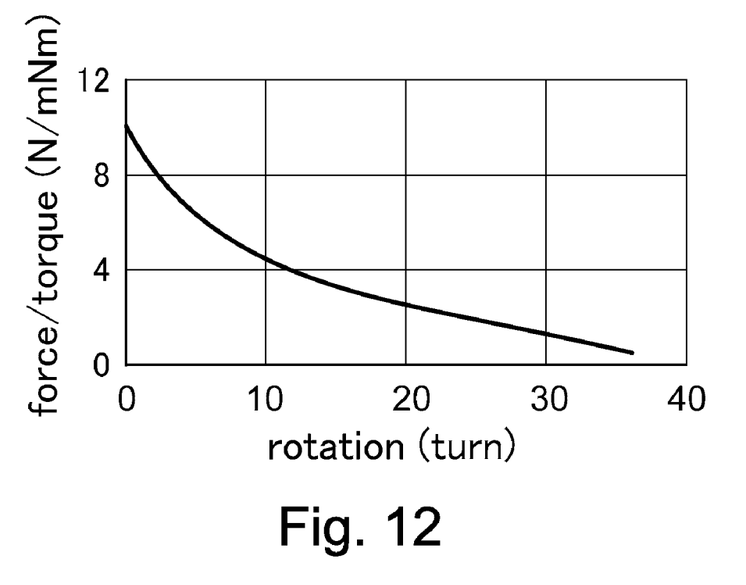
FIG. 12 is another example of relation between pulling force and rotational torque where lower conversion ratio is achieved.

Motion conversion characteristic of for this example is shown in FIG. 11. The conversion ratio between rotational and linear motion is in the range from minimum 0.65 mm/turn to maximum 9.3 mm/turn (average 2.8 mm/turn). Torque to pulling force conversion ratio is shown in FIG. 12, and is in the range from minimum 0.65N/mNm to maximum 9.8N/mNm (average 3.5N/mNm). Maximum linear speed at motor maximum rotational speed of 300 rpm varies from 32.5 mm/s to 465 mm/s (average 140 mm/s), and maximum pulling force at motor maximum output torque of 100 mNm is 65N to 980N (average 350N).

The mechanism in FIG. 2 with above specifications was used to drive a pivot joint 6. 100 mm motion range of motion element 13 was used with fixture radius 57.3 mm from the pivot joint 6 to rotate the pivot joint 6 for 100 angular degrees. In this case the torque on the joint varies from 3.7 Nm to 56 Nm (average 20 Nm). The rotational speed range of the pivot joint 6 is between 5.4 rpm to 77.5 rpm (average 23.3 rpm). Equivalent reduction ratio between the motion element 13 the pivot joint 6 is from 555:1 to 39:1 (average 129:1).

To control a pulling force in the embodiments and applications of the present invention a load-cell type force sensor can be used as a sensor attached to the motion element for feedback signal, and the motor torque is then controlled accordingly to generate precisely the required pulling force.

The present invention is applicable into mechanisms to actuate the robot joints in arms, legs, fingers or other parts of the robots. The size of the present invention can be reduced for possible use in medical forceps, artificial limbs, micromechanical devices, toys, and other industrial or non-industrial applications.

I claim:

1. A rotary to linear or rotary to linear motion conversion device comprising two sets of at least two flexible linking members, a rotational element to which, on one side one of said two sets of said flexible linking members has ends connected at the center of rotation of said rotational element and, on the other side, the other of said two sets of said flexible linking members has ends connected at the center of rotation of said rotational element, a pair of motion elements which are at distance away from said rotational element in the direction of a rotational axis of said rotational element on both sides of said rotational element and are linked by means of stiff or compliant member and are movable primarily in the direction of said rotational axis of said rotational element and are supported by means that prevent rotation around said rotational axis of said rotational element and to which each said set of said flexible linking members have the other ends connected at locations that are spaced equally from said rotational axis of said rotational element at distance A, which is larger than thickness radius R and smaller than length L of said flexible linking members, allowing said two sets of said flexible linking members to twist around each other or untwist depending on the direction of rotation of said rotational element causing the relative distance between said rotational element and said pair of motion elements to vary, and having one of said two sets of said flexible linking members twisted in-advance around each other and said flexible linking members of the other of said two sets of said flexible linking members not twisted around each other in advance so that said in-advance non-twisted flexible linking members are twisted around each other when said rotational element is rotated in the direction to untwist said in-advance twisted flexible linking members and in this way convert a rotation of said rotational element into a relative motion of said pair of motion elements and said rotational element primarily in the direction of said rotational axis of said rotational element and convert a rotational torque on said rotational element into a pulling force on said pair of motion elements primarily in the direction of said rotational axis of said rotational element or convert a motion of said pair of motion elements primarily in the direction of said rotational axis of said rotational element into a rotation of said rotational element and convert a pulling force on said pair of motion elements primarily in the direction of said rotational axis of said rotational element into a rotational torque on said rotational element.

2. The motion conversion device of claim 1 in which sensing means to detect a rotational angle of said rotational element, sensing means to detect a motion of said motion elements, sensing means to detect a rotational torque on said rotational element, sensing means to detect a pulling force on said motion elements, means to control a relative or an absolute position or a speed or a rotational torque or a pulling force are employed in any combination of said sensing means and said control means on said rotational element and said motion elements.

* * * * *